(No Model.)

G. E. TURNER.
SECTION CAR TRUCK FOR STREET RAILWAYS.

No. 579,195. Patented Mar. 23, 1897.

UNITED STATES PATENT OFFICE.

GEORGE EDMUND TURNER, OF MARION, OHIO.

SECTION CAR-TRUCK FOR STREET-RAILWAYS.

SPECIFICATION forming part of Letters Patent No. 579,195, dated March 23, 1897.

Application filed August 7, 1896. Serial No. 602,039. (No model.)

*To all whom it may concern:*

Be it known that I, GEORGE EDMUND TURNER, a citizen of the United States, residing at Marion, in the county of Marion and State of Ohio, have invented certain new and useful Improvements in Section Car-Trucks for Street-Railways; and I do declare the following to be a full, clear, and exact description of the invention, such as will enable others skilled in the art to which it appertains to make and use the same.

My invention has relation to improvements in section car-trucks for street-railways, and the object is to provide a simple, convenient, and practical truck of this class.

To this end the novelty consists in the construction, combination, and arrangement of the same, as will be hereinafter more fully described, and particularly pointed out in the claims.

In the accompanying drawings the same figures of reference indicate the same parts of the invention.

Figure 1:
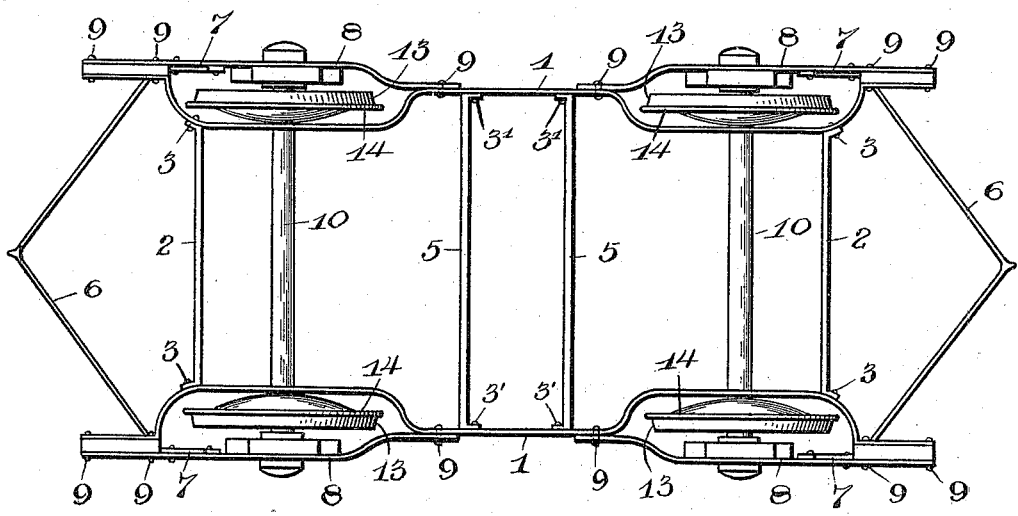
Figure 2:
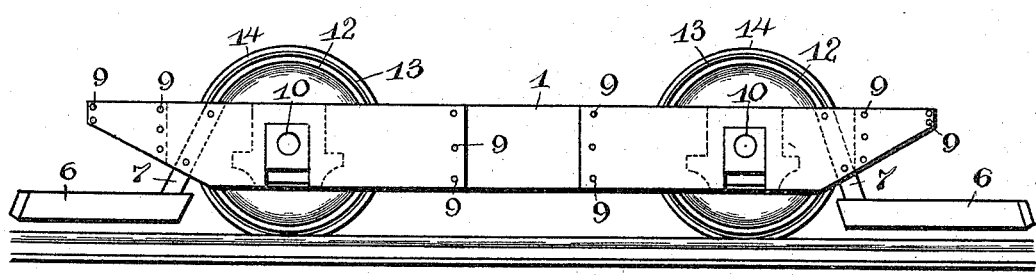

Figure 1 is a top plan view of my improved section car-truck, and Fig. 2 is a side elevation of the same.

The main frame comprises the longitudinal steel side plates 1 1, the transverse end braces 2 2, rigidly and permanently secured to the side plates 1 1 by rivets 3 3, and the central parallel motor suspension-bars 5 5 are likewise secured to the side plates by rivets 3' 3'.

6 6 are the fenders or wheel-guards secured to the lower ends of the brackets 7 7, the upper ends thereof being secured to the side plates in the usual manner.

8 8 are the sectional side plates, which are removably bolted to the longitudinal side plates 1 1 by bolts 9 9.

10 10 are the axles provided with the ordinary wheels 12, formed with an outwardly-tapering periphery 13, upon which is shrunk the tread-rim 14. When an accident happens to said rim 14, or it is necessary to replace it with a new one, the bolts 9 9 are removed, and also the sectional side plate 8. This gives direct access to the wheel, and the damaged rim or tire being removed therefrom a new one is shrunk on without removing the wheels or axles from the truck. The section-plate 8 is then replaced, the bolts 9 9 secured in place, and the car is ready for service. This form of wheel and truck is a great saving in time and expense in replacing worn wheels, as well as the time saved when the car is out of service.

Although I have specifically described the construction and relative arrangement of the several elements of my invention, I do not desire to be confined to the same, as such changes or modifications may be made as clearly fall within the scope of my invention without departing from the spirit thereof.

I do not claim the construction of the sectional wheel in this application.

Having thus fully described my invention, what I claim as new and useful, and desire to secure by Letters Patent of the United States, is—

1. A car-truck comprising the longitudinal side plates 1 1, the rigid end braces 2 2, and the removable side plates 8 8, substantially as and for the purpose set forth.

2. A car-truck comprising the longitudinal side plates 1 1, the rigid end braces 2 2, the central parallel suspension-bars 5 5, and the removable side plates 8 8, substantially as and for the purpose set forth.

In testimony whereof I hereunto affix my signature in presence of two witnesses.

GEORGE EDMUND TURNER.

Witnesses:
J. A. WALFORD,
KENDRICK TURNER.